United States Patent Office 3,328,242
Patented June 27, 1967

3,328,242
CYCLOPENTADIENYLIMINES MICROBICIDE
Edward D. Weil, Lewiston, N.Y., assignor to Hooker Chemical Corporation, Niagara Falls, N.Y., a corporation of New York
No Drawing. Filed Nov. 25, 1964, Ser. No. 413,987
16 Claims. (Cl. 167—30)

This invention comprises a new and useful method for the control of microbes, such as fungi and bacteria, and for the control of plant diseases caused by microbial pathogens, especially by fungal pathogens. More particularly, the invention comprises a method for the control of microbial pathogens and plant diseases caused by microbial pathogens by applying to the locus of said pathogens an effective quantity of a tetrahalocyclopentadienone derivative, which may be structurally represented as

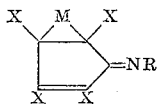

wherein M represents either a second chemical bond between the two attached carbons or a bivalent radical of the structure

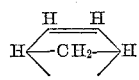

wherein R is a radical selected from the group consisting of OH, NH$_2$ and NHC$_6$H$_5$ and X is halogen, preferably chlorine or bromine.

The compound wherein X is chlorine, R is OH and M is a chemical bond is a known substance, having been described by Roedig and Hornig, Chemische Berichte, 88, 2003 (1955) as the product from 1,2,3,4-tetrachlorocyclopentadiene and ethyl nitrite in the presence of hydrogen chloride. However, the antimicrobial utility of the compound had not been recognized and in view of the lack of related known fungicides, could not have been predicted. The remaining compounds are described in U.S. Patent 3,141,043.

Plant diseases against which the method of the invention are effective include those caused by Pythium, Rhizoctonia, Fusarium, powdery mildew, and other fungi, also Pseudomonas, Xanthomonas, and other bacteria.

The method of the invention includes application of effective amounts of the stated chemicals to the foliage, root system (or medium in which the roots are growing), or to the seed. The mode of application will, of course, depend on the locus of the pathogens to be controlled.

Effective quantities range from about 0.05–200 pounds per acre, the lower amounts, such as 0.05–10 pounds/acre, being used when placement is exactly at the locus of the pathogens or a seedling to be protected so that material is not wasted in the areas between plants, for example, when the chemical is applied on or with seed during a planting operation. Higher rates, such as 10–200 pounds per acre are used when a body of soil is treated to a considerable depth. In foliar applications, quantities of 0.2–50 pounds per acre are most practicable. For foliar applications the chemical will usually be applied as an aqueous spray containing about 0.2–50 pounds compound per 100 gallons.

The method of the invention comprises applying any of the said chemicals, either in pure form (usually in a fine state of subdivision) or in a formulated form. The compounds may be dissolved in a solvent such as acetone, or more conveniently, may be formulated as a wettable powder or dust, employing in most cases a solid carrier or diluent such as clay, talc, calcium carbonate, or the like. Where a wettable powder is to be produced, one or more surface active agents are generally employed, such as dispersants of the lignosulfonate salt type and wetting agents of the alkylarylsulfonate type, to name a few. A further list of surfactants which may be employed is given by McCutcheon, "Detergents and Emulsifiers," Morristown, N.J., 1962.

The compositions used for the method of our invention may also incorporate other pesticides to achieve additive or in some cases, synergistic effects. For example, they may contain other fungicides such as sulfur, captan, organomercury compounds, dinitroalkylphenyl esters, fungicidal quinoxalines, copper salts, dithiocarbamate salts, nitropolychlorobenzenes, nitrotetrachloroanisole, 1,4-dimethoxydichlorobenzene and the like.

The compositions may also include insecticide and miticides such as DDT, lindane, chlordane, dieldrin, aldrin, endrin, insecticidal phosphates, insecticidal carbamates (such as carbaryl), bis(pentachlorocyclopentadienyl), endosulfan, and the like. A more complete list of suitable adjuvant insecticides is given by Kenaga, Bulletin of the Entomological Society of America, vol. 9, No. 2 (June 1963).

*Example 1.—Wettable powder formulation*

The following are blended and ground in a hammer mill:

Parts by weight
Tetrachlorocyclopentadienone oxime _____ 10
Microcel E (synthetic silicate carrier) _____ 24
Sorbit P (alkylarylsulfonate wetting agent) _____ 2
Marasperse N (lignosulfonate dispersing agent) _____ 4

*Example 2*

Soil heavily infested with Pythium fungus was admixed with powdered tetrachlorocyclopentadienone oxime at various rates. In this soil, beans were planted. One week later the percentage of emergence of healthy seedlings was determined, with results as follows:

Rate (pounds per acre):     Percent emergence
  0 _____ 0
  8 _____ 80
 16 _____ 90
 32 _____ 100

In a like manner, application of tetrachlorocyclopentadienone phenylhydrazone at the rate of 50 pounds per acre are resulted in 50% emergence of the plants.

*Example 3*

Cotton plants were grown from seed in soil infested with Rhizoctonia. In one plot, tetrachlorocyclopentadienone oxime was admixed with the soil at 64 pounds per acre. In the other plots, no chemical was used. In these latter plots, virtually all the seedlings were destroyed by the Rhizoctonia infection, whereas in the treated plot, 90% of the seedlings emerged undamaged.

*Example 4*

Tomato plants were sprayed with an aqueous dispersion of several of the chemicals of the invention at 0.04% concentration, and were then deliberately inoculated with spores of *Alternaria solani*, the causative organism of early blight disease. One week later, when similarly inoculated but unsprayed plants were showing severe leaf lesions characteristic of the disease, the plants sprayed with the various compounds were observed to be partially or substantially free of the disease symptoms as shown in the following table.

Compound: Percent Disease Control (repression of leaf lesions)
Tetrachlorocyclopentadienone oxime _____ 100
Tetrachlorocyclopentadienone hydrazone _____ 98
Tetrachlorocyclopentadienone phenylhydrazone _____ 76

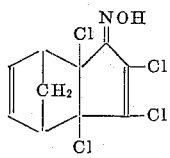

In a similar manner, a high degree of control of early blight disease is obtained by applying 0.04% dispersions of

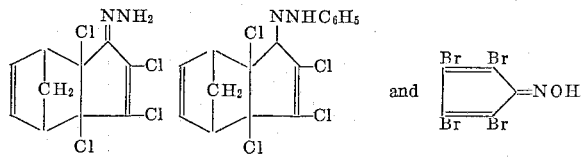

While various embodiments of the present invention have been described and illustrated in the preceding specification, the invention is not to be understood as limited thereto. It is to be recognized that changes and substitutions of equivalents may be made in the invention without departing therefrom or being outside the scope thereof. It is intended to cover the invention broadly in whatever form its principles may be utilized.

What I claim is:
1. A method for the control of plant diseases caused by microbial pathogens which comprises applying to the locus of the disease an effective amount of at least one compound of the structure

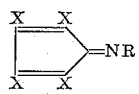

wherein R is a radical selected from the group consisting of OH, $NH_2$ and $NHC_6H_5$, and X is a halogen.

2. A method for the control of plant diseases caused by microbial pathogens which comprises applying to the locus of said pathogens an effective amount of tetrahalocyclopentadienone oxime wherein the halogen is selected from bromine and chlorine.

3. The method of claim 1 wherein the halogen is chlorine.

4. The method of claim 1 wherein the compound is applied in combination with at least one formulation adjuvant.

5. The method of claim 1 wherein the compound is applied to plant foliage.

6. The method of claim 1 wherein the compound is applied to the soil in which the plants to be protected are to be grown.

7. The method of claim 1 wherein the compound is applied to the seeds of the plants to be protected.

8. The method of claim 1 wherein the tetrahalocyclopentadienone derivative is applied at the rate of 0.05–200 pounds per acre.

9. A method for the control of microbes which comprises contacting microbes with an effective amount of a compound of the structure

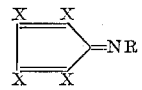

wherein R is a radical selected from the group consisting of OH, $NH_2$, and $NHC_6H_5$ and X is a halogen.

10. A method for the control of bacteria which comprises contacting bacteria with an effective amount of a compound of the structure

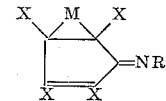

wherein M is selected from the group consisting of a second chemical bond between the two attached carbons and a bivalent radical of the structure

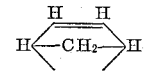

wherein R is a radical selected from the group consisting of OH, $NH_2$ and $NHC_6H_5$ and X is a halogen.

11. A method for the control of fungi, which comprises contacting a fungus with an effective amount of a compound of the formula

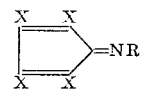

wherein R is a radical selected from the group consisting of OH, $NH_2$ and $NHC_6H_5$ and X is a halogen.

12. A method for the control of bacteria selected from the group consisting of Pseudomonas and Xanthomonas which comprises contacting such bacteria with an effective amount of a compound of the structure

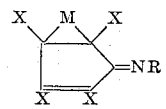

wherein M is selected from the group consisting of a second chemical bond between the two attached carbons and a bivalent radical of the structure

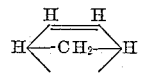

wherein R is a radical selected from the group consisting of OH, $NH_2$ and $NHC_6H_5$ and X is a halogen.

13. A method for the control of fungi selected from the group consisting of Pythium, Rhizoctonia, Fusarium, *Alternaria solani,* and powdery mildew, which comprises contacting such a fungus with an effective amount of a compound of the formula

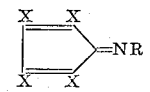

wherein R is a radical selected from the group consisting of OH, $NH_2$, and $NHC_6H_5$ and X is a halogen.

14. A method according to claim 9 wherein the compound applied is tetrachlorocyclopentadienone oxime.

15. A method according to claim 9 wherein the compound applied is tetrachlorocyclopentadiene hydrazone.

16. A method according to claim 9 wherein the compound applied is tetrachlorocyclopentadiene phenylhydrazone.

References Cited
UNITED STATES PATENTS 3,141,043   4/1964   McBee _____ 167—30 X ALBERT T. MEYERS, *Primary Examiner.*

JULIAN S. LEVITT, *Examiner.*

J. D. GOLDBERG, *Assistant Examiner.*